Figure 1:
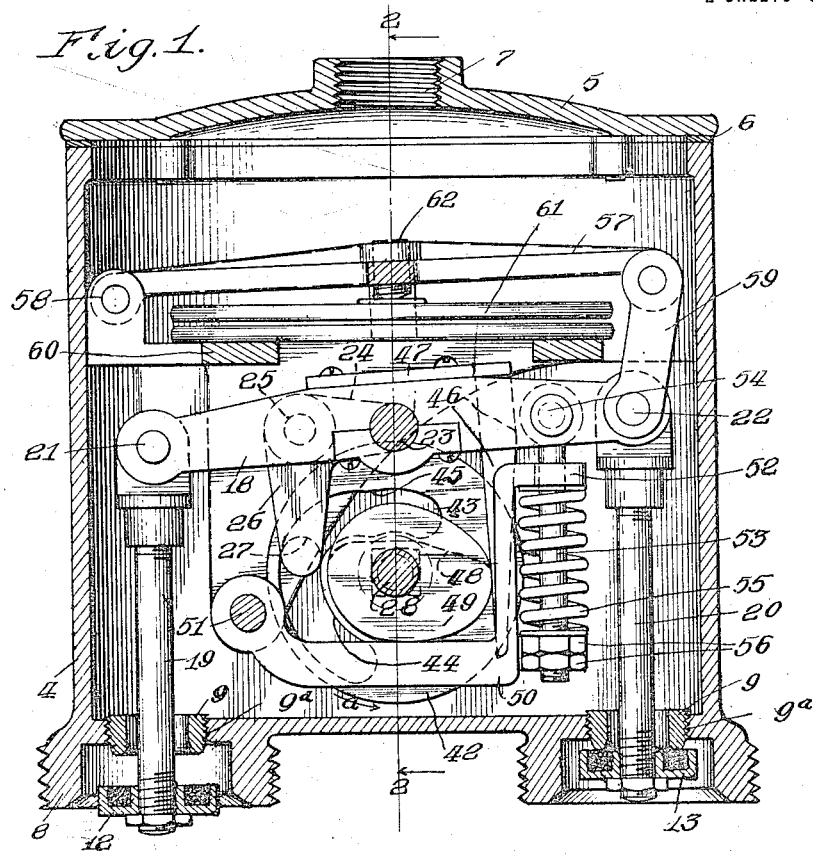

J. L. SPARKS.
MIXING DEVICE FOR HOT AND COLD WATER.
APPLICATION FILED AUG. 15, 1914.

1,183,599.

Patented May 16, 1916.
2 SHEETS—SHEET 1.

Witnesses:
Inventor
James L. Sparks
Attys.

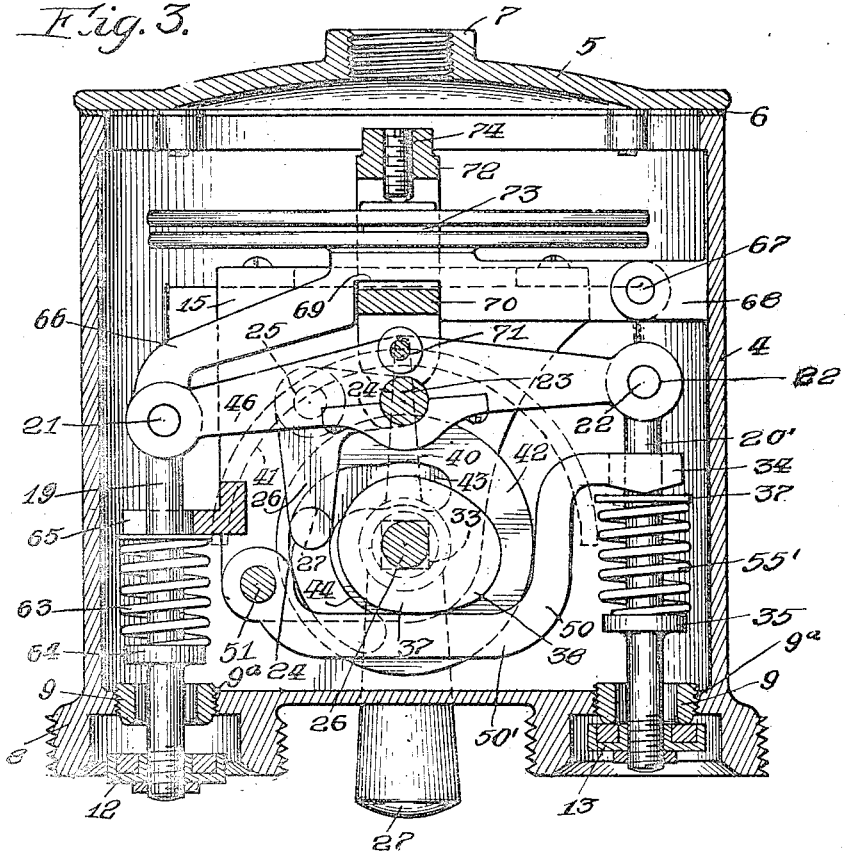

UNITED STATES PATENT OFFICE.

JAMES L. SPARKS, OF CHICAGO, ILLINOIS.

MIXING DEVICE FOR HOT AND COLD WATER.

1,183,599.  Specification of Letters Patent.  Patented May 16, 1916.

Application filed August 15, 1914. Serial No. 856,899.

*To all whom it may concern:*

Be it known that I, JAMES L. SPARKS, a citizen of the United States, residing at Chicago, in the county of Cook and State of Illinois, have invented certain new and useful Improvements in Mixing Devices for Hot and Cold Water, of which the following is a specification.

Devices of this character ordinarily comprise a chamber located conveniently near the place where the mixture of hot and cold water is to be used, as for example, near the supply outlet for a bathtub or shower bath. The hot and cold water are led by separate pipes into said chamber, each pipe being controlled by an independent inlet valve. The discharge of water from the chamber is usually controlled by a third or discharge valve. Considerable difficulty has been heretofore encountered in regulating the temperature of the water discharged from the chamber to that desired, and ordinarily it is necessary to separately adjust the hot and cold water inlet valves respectively, a manipulation which is inconvenient and requires considerable time. Furthermore, owing to the fact that the pressure in the hot or cold water supply frequently varies within wide limits, due to withdrawals through other connections or clogging or other causes, the temperature of the water discharged from the chamber frequently changes though the inlet valves for the hot and cold water respectively may remain in the same position. Moreover, it not infrequently happens that the pressure upon the cold water service is substantially shut off while the pressure upon the hot water service remains high so that substantially untempered hot water is discharged which may even reach the boiling point so that there is great danger of scalding the person when the mixing device is used for bathing purposes.

My invention obviates the difficulties and objections referred to above in that I need employ no discharge valve and only two inlet valves, and a single handle is employed for manipulating both inlet valves the continuous movement of which in one direction first turns on the cold water, and then gradually opens the hot water valve, at the same time gradually closing the cold water valve until they are in adjusted position and the desired mixture is obtained. Provision is also made whereby the valves are controlled thermostatically, the temperature of the water discharged from the chamber being maintained automatically at the degree for which the handle is set and, in the event that for any reason the supply of cold water fails the flow of hot water is shut off altogether, thereby avoiding any danger of scalding.

In the accompanying drawings forming a part of this application I have shown and in the following specification described in detail two preferred forms of my invention. It will be understood, however, that the specific disclosure is for the purpose of exemplification only and that the scope of my invention is defined in the following claims in which I have endeavored to distinguish it from the prior art so far as known to me without, however, relinquishing or abandoning any portion thereof.

Figure 2:
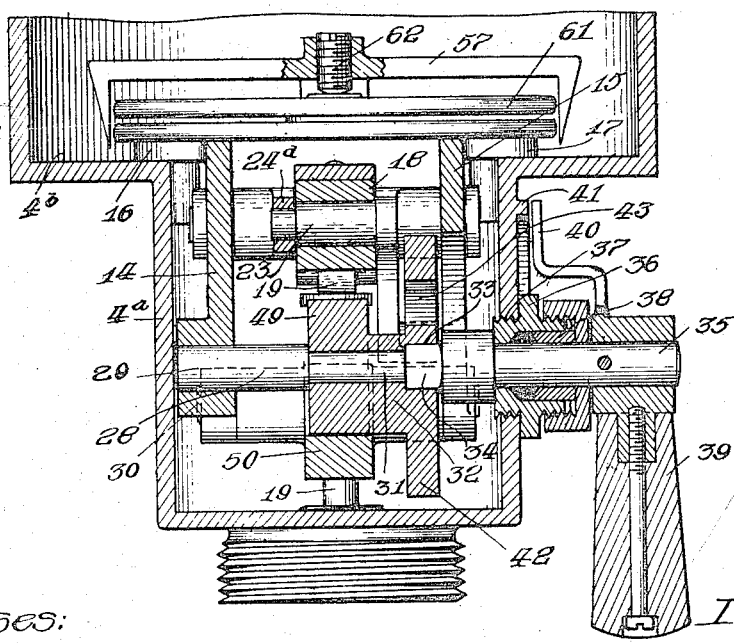

Referring now to the accompanying drawings, Figure 1 is a substantially central vertical section through a preferred form of the mixing device, parts being shown in elevation; Fig. 2 is a similar section on line 2—2 of Fig. 1 but at right angles to the plane thereof and Fig. 3 a view similar to Fig. 1 of a second form of the device.

Referring first to the form of the invention shown in Figs. 1 and 2, the mixing chamber is shown at 4 and may be of any suitable character and material, here shown, however, as a cast metal casing cylindrical in its upper part having a cover 5 secured thereto by screws or the like, the joint between the cover and casing proper being packed at 6 to prevent leakage. The lower portion 4ª is flattened producing shoulders at 4ᵇ upon which the valve operating mechanism is supported. The outlet is formed in the cover at 7 and the cold water connection consists of an externally-threaded hollow boss 8 communicating through a valve seat 9 screwed into an opening 9ª in the casing, the hot water connection being similarly formed as shown at 10. The valve operating mechanism is mounted upon a frame comprising a pair of side plates 14, 15 and flanges 16, 17 which project over upon the shoulders 4ᵇ and are suitably secured thereto. The valves are connected to a valve lever 18 by stems 19, 20, pivoted to said valve lever at 21, 22, respectively. The valve lever is in turn pivoted at 23 on a shiftable pivot carried by the double arm 24 of a bell crank lever which is pivoted at 25 to the frame referred to above. The other arm 26 of said bell crank lever carries a stud 27 which is operated by a cam to be presently described, the object of which construction is that the valve lever may be raised from and lowered toward the valve seats by means of the shiftable pivot 23, the valves being both carried into engagement with their seats when the shiftable pivot is raised but being movable therefrom, in a manner to be presently described when the shiftable pivot is lowered.

The cam referred to above by which the bell crank lever is actuated is mounted upon a shaft 28 journaled at 29 in a boss 30 upon the plate 14 of the depending frame. The other end of the shaft is reduced at 31 and receives a compound cam 32 which is formed with a coaxial squared socket 33 to receive the squared end 34 of a handle shaft 35. The latter is removably journaled in the casing by a bearing 36 screwed into an opening 37 in the casing and provided with a packing gland 38 about the shaft 35, and the latter carries a handle 39 and a pointer 40, which coöperates with a graduated arc 41 on the casing to indicate the position to which the handle is turned. When the supporting bearing and the handle shaft are in place in the casing the latter serves to support the adjacent end of the cam shaft 28. The cam 42 by which the bell crank lever is operated is an integral part of the compound cam and is in the form of a disk having a slot 43 engaging the stud 27 on said lever and the slot is in part concentric as at 44 and in part eccentric as at 45. When the valves are closed the stud 27 is at the eccentric end of said slot and during the first movement of the cam in the direction indicated by the arrow a the stud rides outward in said slot, carrying the shiftable pivot and the valve lever downward to their lowest positions and the further revolution of the cam only maintains the shiftable pivot stationary.

As above stated, when the valve lever is lowered by lowering the shiftable pivot the valves are lowered and free to leave their seat but it being desirable for obvious reasons that the cold water valve be first opened, a means is provided for holding the hot water valve to its seat during a part at least of the downward movement of the valve lever.

The device as heretofore described is or may be identical in both of the forms in which I have chosen to illustrate my invention but different specific means are employed in the respective forms for rotating the valve lever about the shiftable pivot as it is lowered to maintain the hot water valve closed and open the cold water valve.

In the form shown in Fig. 1 the valve lever is provided with an arm 46 which may be integral therewith or, as shown, applied thereto, being formed with a flange 47 for this purpose which is screwed to the valve lever. The compound cam referred to above comprises a cam section 48 (shown in dotted lines in Fig. 1) which engages and coöperates with said arm to tilt or rock the valve lever as it is lowered to maintain the hot water valve 13 against its seat and at the same time open the cold water valve 12, the operation of the cams 48 and 42 being simultaneous. After the cold water valve has reached its maximum open position the further revolution of the handle has no effect upon the bodily movement of the valve lever due to the lowering of the shiftable pivot, but the further movement of the cam 48 relieves the arm 46 so that the valve lever is free to swing in the opposite direction upon the shiftable pivot. By thus swinging the valve lever the cold water valve is gradually drawn toward its seat whereas the hot water valve is correspondingly moved away from its seat. In order to effect this swinging movement of the valve lever I form the compound cam with a third section 49 which engages an arm 50 pivoted at 51 to a part of the stationary depending frame. The outer end of said arm is bent upwardly and then outwardly and at its end 52 surrounds an eye-bolt 53 which is pivoted at 54 to the valve lever and depends therefrom. A spring 55 surrounds the eye-bolt beneath the end of the arm and is put under pressure by nuts 56. Obviously the cam 49 bearing upon the arm 50 exerts a yielding pressure upon the valve lever to swing the same and as the latter is gradually relieved by the cam 48 it is rocked to gradually open the hot water valve and at the same time to partially close the cold water valve. The cams are so arranged, however, relatively to each other that the cam 48 does not come into action materially until the stud 27 reaches the concentric portion of the slot 44 and until the point of maximum radius of the cam 48 has passed out of contact with the arm 46. It will thus be seen that during the initial rotation of the handle the valve lever is first lowered releasing the pressure of the valves on their seat while at the same time it is swung to maintain the hot water valve closed and open the cold water valve, but the continued movement of the handle causes the valve lever to be again swung but in the opposite direction to gradually open the hot water valve and to partially close the cold water valve.

In order to maintain the temperature of the water flowing through the device constant, notwithstanding variations in the pressure or temperature of the water, in the respective supply pipes, I provide, as stated above, thermostatically operated means for controlling the relative opening of the valves. For this purpose an arm 57 is pivoted to the stationary frame at 58 and connected at its outer end by a link 59 to the adjacent end of the valve lever. Between said arm 57 and a stationary support 60, forming part of said frame, are inserted one or more thermostatic elements 61 which have the property of expanding when heated, and which together form a thermostatic motor, controlled by the temperature in the casing. I have shown in the accompanying drawings a common form of said elements consisting in a thin circular hollow body or drum of thin sheet metal which contains some suitable expansive fluid such as ether and is hermetically sealed. An adjusting screw 62 upon the arm 57 bears upon the center of the uppermost element so that as the temperature of the water in the casing rises, the pressure of these elements is transmitted to the arm 57 and by it to the valve lever to rock the same about the shiftable pivot, and carry the hot water valve toward and the cold water valve away from its seat thereby decreasing the flow of hot water and increasing the flow of cold water. And as the temperature of the water decreases the contrary movement takes place, the movement being limited in the one direction by the contact of the arm 46 with its cam 48 so that within the limits of movements of the part the valves will be moved from adjusted position to maintain the temperature of the water constant. Obviously the spring 55 will yield to permit this action of the thermostatic elements.

In the modification illustrated in Fig. 3, the casing, valves, valve lever, bell crank for raising and lowering the valve lever and cam for operating the latter are as described in connection with the preferred modification. The means for manually swinging the valve lever to open the hot water valve is also substantially like that just described except that the arm 50 embraces the stem 20' of the hot water valve and swings the valve lever by compressing the spring 55'. Instead of the arm 46 and coöperating cam 48 for maintaining the hot water valve closed and opening the cold water valve as the valve lever is lowered, I employ in this second modification a spring 63 intermediate a collar or enlargement 64 upon the stem of the cold water valve and a stationary abutment 65 forming a part of the depending frame. Obviously as the valve lever is lowered it will be rocked by the spring 63 to open the cold water valve and maintain the hot water valve closed. In this form of the device I have shown a different but equivalent arrangement of the thermostatic means for operating the valves though that previously described might obviously be employed. The means referred to consist in an arm 66 pivoted at 67 to a lug 68 upon the casing and at its free end journaled on the pivot 21 by which the cold water valve is connected to the valve lever. The arm 66 is recessed at 69 to receive a cross member 70 of a yoke which is pivoted to the beam at 71 and extends on opposite sides thereof. A tie bar 72 is connected at its ends to the ends of the cross piece 70 and extends above but spaced from the arm 66 and between said tie bar and arm are inserted thermostatic elements 73 which may be of the same character as those previously described, an adjusting screw 74 being employed to bear upon the thermostatic elements and which may be turned to set the device for the temperature desired. The operation of this second thermostatic arrangement is substantially like that described in connection with that of the first form of my invention. As the temperature rises the thermostatic elements expand forcing the pivoted arm 66 downward at its outer end, so swinging the valve lever to move the cold water valve away from and the hot water valve toward their respective seats.

The manipulation and operation of the two forms of the invention are alike. As the handle is turned from the closed position the valve lever is first shifted bodily toward the inlets and simultaneously swung about its pivot to cause the cold water valve to open gradually to its fullest extent. As the rotation of the handle is continued the bodily movement of the valve lever ceases but it now slowly swings in an opposite direction to its first movement to gradually open the hot water valve and correspondingly shut off the cold water supply and thus place the valves in adjusted position for the desired temperature. As the hot water valve is opened the thermostatic elements expand under the action of the rising temperature of the water and oppose the movement, the spring 55 being put under increasing pressure as the handle is turned until it is in equilibrium with the thermostat at the required temperature of the water. No further manipulation is necessary notwithstanding variations in the respective pressures of the hot and cold water for the thermostat maintains the temperature constant. Obviously if the temperature or pressure of the hot water rises for any reason, the increased temperature of the mixture in the device causes the thermostatic elements to turn the valve lever against the pressure of spring 55 to move the valves from adjusted position so as to further open the cold water valve and partially close the hot water valve and if on the contrary the temperature of the water in the casing is lowered the thermostatic elements yield under the pressure of the spring to further open the hot water valve and partially close the cold water valve. The device is simple in construction, easy to operate and repair and absolutely reliable.

I claim:

1. In a device of the class described, a casing having an outlet and a pair of inlets, valves controlling said inlets, a valve lever, a shiftable pivot for the support of said valve lever, means whereby said valves are connected to said valve lever in such a way that when said valve lever is turned about said pivot one of said valves moves toward closed position and one moves away from closed position, means whereby said pivot may be shifted and said valve lever turned about its pivot to move said valves from closed to adjusted position.

2. In a device of the class described, a casing having an outlet and a pair of inlets, valves controlling said inlets, a valve lever, a shiftable pivot for the support of said valve lever, means whereby said valves are connected to said valve lever in such a way that when said valve lever is turned about said pivot one of said valves moves toward closed position and one moves away from closed position, means whereby said pivot may be shifted and said valve lever turned about said pivot to move said valves from closed to adjusted position, a thermostatic motor controlled by the temperature in said casing, and means operated by said motor to turn said lever.

3. In a device of the class described, a casing having an outlet and a pair of inlets, valves controlling said inlets, a valve lever, valve stems connecting said valves to said valve lever, a shiftable pivot supporting said valve lever intermediate of said valve stems, means whereby said pivot may be shifted and said valve lever turned about said pivot, a thermostatic motor controlled by the temperature in said casing, and means operated by said motor to turn said valve lever about said pivot.

4. In a device of the class described, a casing having an outlet and a pair of inlets, valves controlling said inlets, means whereby said valves may be placed in adjusted position, a thermostatic motor controlled by the temperature in said casing, means operated by said motor whereby said valves may be moved from adjusted position so that one of said valves is moved toward closed position and the other of said valves is moved away from closed position, and a spring acting to oppose said movement of said valves by the action of said motor.

5. In a device of the class described, a casing having an outlet and a pair of inlets, valves controlling said inlets, a valve lever, a shiftable pivot for the support of said valve lever, means whereby said valves are connected to said lever in such a way that when said lever is turned about said pivot one of said valves moves toward closed position and the other of said valves moves away from closed position, means whereby said pivot may be shifted and said valve lever turned about said pivot to place said valves in adjusted position, a thermostatic motor controlled by the temperature in said casing, means operated by said motor to turn said valve lever, and a spring acting to oppose the turning of said valve lever by the action of said motor.

6. In a device of the class described, a casing having an outlet and a pair of inlets, valves controlling said inlets, a valve lever, valve stems connecting said valves to said valve lever, a shiftable pivot supporting said valve lever intermediate of said valve stems, means whereby said pivot may be shifted and said valve lever turned about said pivot, a thermostatic motor controlled by the temperature in said casing, means operated by said motor to turn said valve lever, and a spring acting to oppose the turning of said valve lever by the action of said motor.

7. In a device of the class described, a casing having an outlet and a pair of inlets, valves controlling said inlets, a valve lever, valve stems connecting said valves to said valve lever, a shiftable pivot supporting said valve lever intermediate of said valve stems, means whereby said pivot may be shifted and said valve lever turned about said pivot, a thermostatic motor controlled by the temperature in said casing, means operated by said motor to turn said valve lever, a spring acting to oppose the turning of said valve lever by the action of said motor, and means whereby the opposing action of said spring may be adjusted.

JAMES L. SPARKS.

Witnesses:
JOHN B. MACAULEY,
ROBERT DOBBERMAN.